(12) United States Patent
Osmanis et al.

(10) Patent No.: US 11,323,691 B1
(45) Date of Patent: May 3, 2022

(54) DISPLAY SYSTEM FOR DISPLAYING THREE-DIMENSIONAL IMAGE AND METHOD THEREFOR

(71) Applicant: Lightspace Technologies, SIA, Marupes novads (LV)

(72) Inventors: Ilmars Osmanis, Mrāpes nov. (LV); Ugis Gertners, Riga (LV); Kriss Osmanis, Babītes nov. (LV); Martins Narels, Riga (LV); Roberts Zabels, Riga (LV); Sandra Balode, Ogres nov. (LV)

(73) Assignee: Lightspace Technologies, SIA, Marupes novads (LV)

( * ) Notice: Subject to any disclaimer, the term of this patent is extended or adjusted under 35 U.S.C. 154(b) by 0 days.

(21) Appl. No.: 17/148,920

(22) Filed: Jan. 14, 2021

(51) Int. Cl.
*H04N 13/339* (2018.01)
*H04N 9/31* (2006.01)
*G02B 27/01* (2006.01)
*G02B 27/30* (2006.01)

(52) U.S. Cl.
CPC ....... *H04N 13/339* (2018.05); *G02B 27/0172* (2013.01); *H04N 9/3152* (2013.01); *G02B 27/30* (2013.01)

(58) Field of Classification Search
USPC .......................................................... 348/53
See application file for complete search history.

(56) References Cited

U.S. PATENT DOCUMENTS

| | | | |
|---|---|---|---|
| 2015/0235454 A1* | 8/2015 | Schowengerdt | G06T 5/50 |
| | | | 345/633 |
| 2021/0167268 A1* | 6/2021 | Pendse | G02B 5/3016 |
| 2021/0173222 A1* | 6/2021 | Makinen | G02B 27/30 |
| 2021/0397254 A1* | 12/2021 | Seibel | G06N 3/08 |

\* cited by examiner

*Primary Examiner* — Behrooz M Senfi
(74) *Attorney, Agent, or Firm* — Ziegler IP Law Group, LLC

(57) ABSTRACT

A display system and a method for displaying a three-dimensional image. A light source is employed to emit a light beam towards a first optics. The first optics is employed to collimate and form the light beam and provide the collimated light beam towards a spatial light modulator. The spatial light modulator is employed to modulate the collimated light beam and the modulated light beam is provided to a first direction. A first optical image expander is inclined at a first angle 'α' in respect to the first direction and is employed to reflect the modulated light beam to a second direction. A second optical image expander is inclined at a second angle 'β' in respect to the second direction and is employed to reflect the reflected light beam to a third direction. A screen element is arranged on the optical path for displaying a three-dimensional image.

20 Claims, 12 Drawing Sheets

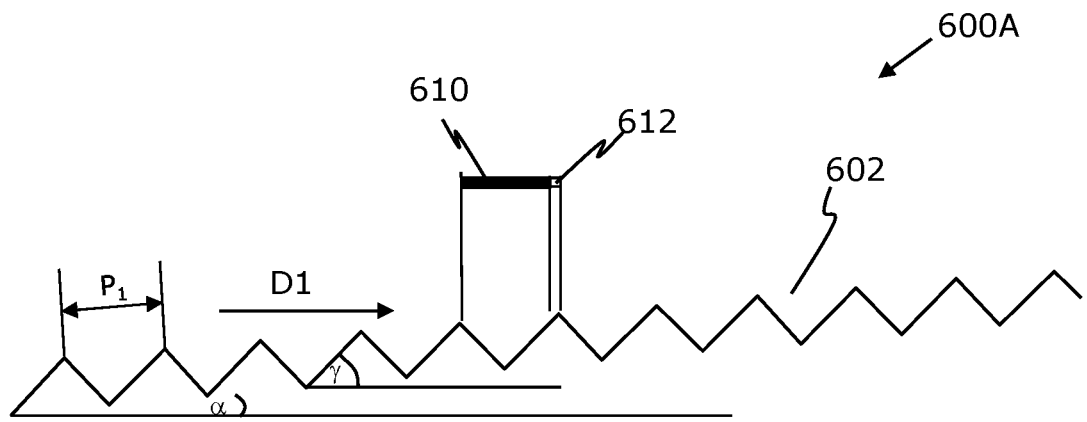
FIG. 6A
FIG. 6B
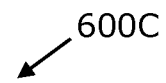
FIG. 6C

DISPLAY SYSTEM FOR DISPLAYING THREE-DIMENSIONAL IMAGE AND METHOD THEREFOR

TECHNICAL FIELD

The present disclosure relates generally to display devices; and more specifically to a display system for displaying a three-dimensional image. Further, the present disclosure relates to a method for displaying the three-dimensional image. Furthermore, the present disclosure relates to volumetric displays including a head mounted display system and a head up display system implementing the disclosed display system.

BACKGROUND

Three-dimensional display devices such as, head mounted displays, also known as near-to-eye displays, are widely used in aviation, engineering, gaming and medicine. Such three-dimensional display devices having stereoscopic configuration conveys three-dimensional (3D) images in true sense. Such display devices rely on binocular disparities as the strongest depth cue for perceived 3D image qualities. However, they do not account for other natural mechanisms attributed to a visual apparatus of human observers. Neglection of peculiarities of a human visual system such as, a link between accommodation and vergence mechanisms, cause constraints for the application of stereoscopic display devices for near-work. This stems from the fact, that if the available single-display focal plane is located at a considerable distance for example, 2 to 10 meters from the observer and the content to be shown to the observer is closer, for instance within the reach of an arm, the introduced mismatch between the accommodation and vergence depth cues is too large resulting in uncomfortable viewing experience. In such cases, the observer may experience blurred vision, eyestrain and may have a hard time concentrating on the formed image. Hence, the observer may have to reduce the overall screen time due to such discomforts while experiencing a visual 3D stimulus.

In order to mitigate the vergence-accommodation conflict in stereoscopic near-to-eye displays some solutions have been proposed, among which are light field displays, holographic displays and also volumetric displays. Nevertheless, these devices while addressing the vergence-accommodation conflict, in practical implementation typically are associated with bulk. For example, the 3D display devices employing volumetric displays provide good quality image and address the vergence-accommodation conflict; however, they are quite bulky. Typically, the volumetric display is comprised of a projection volume which is coupled to a high refresh-rate rear-image projection unit. The projection volume may be, for example, a reciprocating membrane, a stack of electrically switchable optical diffuser elements, a solid state, liquid or gaseous medium, which is excited by other means or directly by a projected image. In these cases, the projection unit, especially if it may not be refocused, requires a large space in order to ensure a sufficient depth of field that is achieved by considerably extending the optical path from the projection unit to the projection volume. The large footprint obtained due to the projection unit is an adverse factor and hence, limits the wide acceptance of such volumetric displays.

In another example, in order to reach reasonable footprint, a light field approach has been employed. Herein, a very high image resolution display panels, such as, 8K displays (or multiple 8K displays) along with microlens or lenslet arrays are used. Nevertheless, such systems have drawbacks associated to image artefacts and general perceived image quality. To ensure a perceptually seamless representation of the light field, multiple views that may reach tens and hundreds, such as, 60 views, 100 views, 200 views etc., have to be presented. In the given architecture, the views or rays are generated by segmenting the display panel through lens elements. Thus, the effective resolution, even when very high image refresh rate panels are used, can become small. Alternatively, if the image resolution is kept at a reasonable value, the number of generated views or rays becomes smaller, which may inflict the image with perceivable image artefacts.

In yet another example, the volumetric display device comprising rear-image projection unit and a solid-state projection volume having a stack of electrically switchable optical diffuser elements, has been proposed to improve on footprint by employing a telecentric optical system. Herein, the optical path and thus, the whole volume of the 3D display is minimized by employing a large reflective optical element whose size is comparable to the optical diffuser elements. With this approach, the system can half its volume while maintaining optimum image quality with uniform magnification and large field of depth. Nevertheless, the footprint reduction in this case is only moderate and still doesn't yield the footprint desirable for the next generation 3D display technologies.

Therefore, in light of the foregoing discussion, there exists a need to overcome various problems associated with conventional display system especially for near-work oriented display of the 3D image, as in purely virtual reality environments and for augmented reality scenarios.

SUMMARY

The present disclosure seeks to provide a display system and a method for displaying a three-dimensional image; and specifically addresses problems related to generally vergence-accommodation conflict and large footprint. Furthermore, the present disclosure seeks to provide a head mounted display system and a head up display system capable of conveying monocular focus cues and eye accommodation support while reducing a foot print in order to make the display device compact and substantially light. An aim of the present disclosure is to provide a solution that overcomes at least partially the problems encountered in prior art, and provides the display system and the method for truthful displaying of the three-dimensional image.

In one aspect, an embodiment of the present disclosure provides a display system for displaying a three-dimensional image, the display system comprising:
  a light source employed to emit a light beam towards a first optics;
  the first optics employed to collimate the light beam and provide the collimated light beam towards a spatial light modulator;
  the spatial light modulator employed to modulate the collimated light beam, the modulated light beam is provided to a first direction;
  a first optical image expander inclined at a first angle 'α' in respect to the first direction, the first optical image expander is employed to reflect the modulated light beam to a second direction;
  a second optical image expander inclined at a second angle 'β' in respect to the second direction, the second optical image expander is on an optical path after the first optical image expander and employed to reflect the reflected light beam to a third direction;

a screen element arranged on the optical path after the second optical expander;

wherein the first optical image expander comprises a first micropatterned surface comprising:

at least a first facet and at least a second facet inclined in respect to the at least first facet;

at least a first pitch comprising the at least first facet and the at least second facet;

wherein the at least first facet is inclined at a third angle 'γ' in respect to the first direction and at least part of the at least first facet is reflective;

and the second optical image expander comprises a second micropatterned surface comprising:

at least a third facet and at least a fourth facet inclined in respect to the at least third facet, at least a second pitch comprising the at least third facet and the at least fourth facet;

wherein the at least third facet is inclined at a fourth angle 'δ' in respect to the second direction and at least part of the at least third facet is reflective.

In another aspect, an embodiment of the present disclosure provides a method for displaying a three-dimensional image comprising:

emitting a light beam from a light source towards a first optics;

receiving the light beam in the first optics and collimating the light beam towards a spatial light modulator;

modulating the collimated light beam on the spatial light modulator and providing the light beam in a first direction;

receiving the modulated light beam on a first optical image expander at a first angle 'α' in respect to the first direction and reflecting the modulated light beam to a second direction;

receiving the reflected light beam on a second optical image expander at a second angle 'β' in respect to the second direction and reflecting the optical light beam in a third direction;

receiving the reflected light beam on a screen element arranged on an optical path after the second optical expander;

wherein the first optical image expander comprises a first micropatterned surface comprising:

at least a first facet and at least a second facet inclined in respect to the at least first reflective facet, at least a first pitch comprising the at least first facet and the at least second reflective facet;

wherein the at least first reflective facet is inclined at a third angle 'γ' in respect to the first direction and at least part of the at least first facet is reflective;

and the second optical image expander comprises a second micropatterned surface comprising:

at least a third facet and at least a fourth facet inclined in respect to the at least third facet, at least second pitch comprising the at least third facet and the at least fourth reflective facet;

wherein the at least third facet is inclined at a fourth angle 'δ' in respect to the second direction and at least part of the at least third facet is reflective.

Embodiments of the present disclosure substantially eliminate or at least partially address the aforementioned problems in the prior art, and enable truthful display of the three-dimensional image. The present display system for displaying a three-dimensional image has the advantage of a reduced footprint, with represented three-dimensional image having lesser vergence-accommodation conflict, as compared to the display devices of the prior art.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIGS. 6A, 6B and 6C are schematic illustrations of the first optical image expander, in accordance with different embodiment of the present disclosure;

Figure 1:
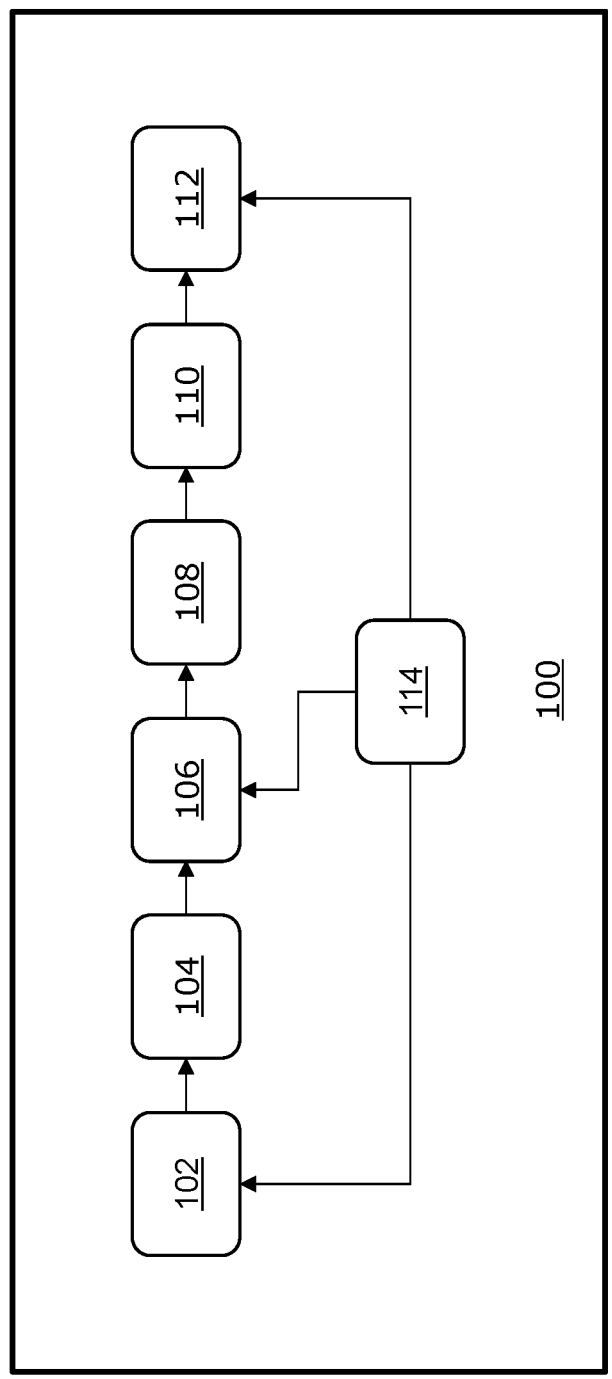
FIG. 1 is a block diagram illustration of a display system for displaying a three-dimensional image, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a display system for displaying a three-dimensional image, the display system comprising:
  a light source employed to emit a light beam towards a first optics;
  the first optics employed to collimate the light beam and provide the collimated light beam towards a spatial light modulator;
  the spatial light modulator employed to modulate the collimated light beam, the modulated light beam is provided to a first direction;
  a first optical image expander inclined at a first angle 'α' in respect to the first direction, the first optical image expander is employed to reflect the modulated light beam to a second direction;
  a second optical image expander inclined at a second angle 'β' in respect to the second direction, the second optical image expander is on an optical path after the first optical image expander and employed to reflect the reflected light beam to a third direction;
  a screen element arranged on the optical path after the second optical expander;
  wherein the first optical image expander comprises a first micropatterned surface comprising:
  at least a first facet and at least a second facet inclined in respect to the at least first facet;
  at least a first pitch comprising the at least first facet and the at least second facet;
  wherein the at least first facet is inclined at a third angle 'γ' in respect to the first direction and at least part of the at least first facet is reflective;
  and the second optical image expander comprises a second micropatterned surface comprising:
  at least a third facet and at least a fourth facet inclined in respect to the at least third facet,
  at least a second pitch comprising the at least third facet and the at least fourth facet;
  wherein the at least third facet is inclined at a fourth angle 'δ' in respect to the second direction and at least part of the at least third facet is reflective.

In another aspect, an embodiment of the present disclosure provides a method for displaying a three-dimensional image comprising:
  emitting a light beam from a light source towards a first optics;
  receiving the light beam in the first optics and collimating the light beam towards a spatial light modulator;
  modulating the collimated light beam on the spatial light modulator and providing the light beam in a first direction;
  receiving the modulated light beam on a first optical image expander at a first angle 'α' in respect to the first direction and reflecting the modulated light beam to a second direction;
  receiving the reflected light beam on a second optical image expander at a second angle 'β' in respect to the second direction and reflecting the optical light beam in a third direction;
  receiving the reflected light beam on a screen element arranged on an optical path after the second optical expander;
  wherein the first optical image expander comprises a first micropatterned surface comprising:
  at least a first facet and at least a second facet inclined in respect to the at least first reflective facet,
  at least a first pitch comprising the at least first facet and the at least second reflective facet;
  wherein the at least first reflective facet is inclined at a third angle 'γ' in respect to the first direction and at least part of the at least first facet is reflective;
  and the second optical image expander comprises a second micropatterned surface comprising:
  at least a third facet and at least a fourth facet inclined in respect to the at least third facet,
  at least second pitch comprising the at least third facet and the at least fourth reflective facet;
  wherein the at least third facet is inclined at a fourth angle 'δ' in respect to the second direction and at least part of the at least third facet is reflective.

Throughout the present disclosure, the term "three-dimensional image" herein, relates to an image that provides perception of depth to a viewer of the image. Herein afterwards, the terms "user", "viewer" "observer" and "human" have been interchangeably used without any limitations. The three-dimensional image may be a volumetric image. Herein, the volumetric image may be an image having a height, a width, and a depth in the three-dimensional space. A given three-dimensional (3D) image could be a given volumetric image of at least one three-dimensional object (for example, such as a statue, a vehicle, a weapon, a musical instrument, an abstract design, and the like), a three-dimensional scene (for example, such as a beach scene, a mountainous environment, an indoor environment, and the like), and so forth. Moreover, the term "three-dimensional image" also encompasses three-dimensional computer-generated surfaces. Furthermore, the term "three-dimensional image" also encompasses a three-dimensional point cloud.

The term "display system" as used herein relates to a specialized equipment for presenting the three-dimensional (3D) image to a viewer in a manner that the three-dimensional image truthfully appears to have actual physical depth. In other words, the display system is operable to act as a device for visually presenting the three-dimensional image in a three-dimensional space. Examples of such display system include televisions, computer monitors, portable device displays and so forth. Further, the display system includes display devices that may be positioned near eyes of a user thereof, such as, by allowing the user to wear (by mounting) the near-eye display apparatus on a head thereof. Examples of such near-eye display systems include, but are not limited to, head mounted displays (HMDs), head-up displays (HUDs), virtual-reality display systems, augmented-reality display systems, mixed-reality display systems and so forth.

The display system comprises a light source employed to emit a light beam towards a first optics. It may be appreciated that the light source may be anything that could generate light beams. For example, the light source may be a natural light source or an artificial light source. Herein, the light source emits the light beam. In general, the light beam is a group of a light rays. The light beam may be parallel, convergent or divergent. The light beam is directed towards the first optics. Herein, the first optics may be used to expand, form and/or collimate the light beam, as discussed later in more detail.

Optionally, the light source is selected to be at least one of a laser emitting a visible light spectrum, a light emitting diode (LED), a super luminescent light emitting diode (SLED). The laser stands for light amplification by the stimulated emission of radiation, and is a device which generates light beam by stimulating atoms and molecules to emit light rays of a particular wavelength. It may be appreciated that the laser used in the present disclosure must emit the visible light spectrum as the light beam generated by the laser are used to encode the image information. The light emitting diodes (LEDs) may be a semiconductor device that emits light beam when current is passed through it. Herein, carriers of current such as, electrons and hole may combine with the semiconductor in order to emit light. The super luminescent light emitting diode (SLED) is semiconductor edge emitting device. As may be understood that the light beam emitted from the laser may be already collimated or substantially collimated. Furthermore, in case the light beams emitted by the light source has a divergence angle, it may be contemplated that the light beam emitted from the laser can be collimated to a higher degree with ease in comparison to, for example, light beams emitted by light emitting diodes (LEDs). Hence, in some examples, when the light source is a laser, the collimation may not be necessary for the purposes of the present disclosure. However, if the laser beam is small it has to be enlarged (expanded) and shaped for better corresponding to the geometry of SLM.

It may be appreciated that when the laser is used as the light source, a coherent nature of the laser may cause a phenomenon of "speckle". Herein, the speckle may be small random distribution of varying light intensity which may occur due to interference of light going through optical surfaces with irregularities, which is a side-effect of using lasers. Nonetheless, it may be mitigated by using a de-speckling device, such as, a small oscillating diffuser, a mirror and the like that may help in averaging the light intensity and may smear it out which in turn may help in hiding the speckle. Hence, prior to the first optics, the de-speckling device may be utilized in case of using laser as the light source. It may be appreciated that the SLED may have traits of LEDs and lasers. That is, the light beam emitted from the SLED may be highly directional and the spectral distribution may be wide. Thus, the speckle patterns associated to light beam emitted from the lasers may not be present with the light beam emitted from the SLED. Hence, in contrary to the laser, the SLED may not need any active means of speckle mitigation, such the de-speckling device.

The display system comprises the first optics employed to expand, form, shape and/or collimate the light beam and provide the expanded, formed, shaped and/or collimated light beam towards a spatial light modulator. The first optics may be any suitable optical device used for collimation of light beam. Herein, the collimated light beam is the light beam having, substantially, parallel rays of light. It may be appreciated that the light beam from the light source travelling towards the first optics may not be collimated. The first optics, herein, may collimate the light beam so that they are parallel, have minimum divergence and disperses minimally while propagating towards a display element. As discussed, if the light source is the laser, the collimation may not be necessary in the display system of the present disclosure.

Optionally, the first optics is selected as an arrangement of at least one optical component of a lens, a prism, a meta-surface, a holographic optical element, a diffractive optical element, a reflective optical element. The lens may be a piece of curved glass surface that may help in bending the light rays passing through it. Herein, the lens used may collimate the light beam when passing through it. The prism may be a polygonal transparent optical element that helps in bending of light rays passing through it. The prism used herein, may align the particles of light beam incident on it in such a way that the light beam emerging from the prism is collimated. The meta-surface is thin nano-structured artificial optical element. Herein, contrary to the bending of light rays by refraction by the conventional optical elements such as, lenses, the bending of light rays takes place due to scattering of light rays by nanostructures of varying size. The meta-surface used herein may scatter the light rays of the light beam so as to produce the collimated light beam. The diffractive optical element may have microstructure patterns that may help in controlling the phase of light rays passing through it. The diffractive optical element used herein, may alter the phase of the light rays of the light beam passing through it in such a way that the light beam exiting from it are parallel and hence, collimated. The reflective optical element used herein, may collimate the light beam incident on it by means of reflection.

Optionally, the light beam has a divergence angle less than 1.5 degrees after collimating the light beam in the first optics. Such divergence angle of less than 1.5 degrees ensures that when the light beam may be properly utilized for generating the three-dimensional image, as per the embodiments of the present disclosure. In one example, the light beam has the divergence angle of 1 degree. In another example, the light beam has the divergence angle of 0.5 degrees. In yet another example, the light beam has the divergence angle of 0 degrees.

The display system comprises the spatial light modulator employed to modulate the collimated light beam. The modulated light beam is provided to a first direction. The spatial light modulator is a component in a display system that has an array of light modulating elements, and may be defined as a device that may perform some form of modulation on light rays. For purposes of the present disclosure, the term "spatial light modulator" or "SLM" refers to a one, two or multi-dimensional array of light modulating elements that control or modify incoming or emitted light and the circuitry included to control those elements on a device and all the control circuitry and memory on the device that is performing the spatial light modulation. For example, each element of a spatial light modulator may change the direction of the incoming or emitted light, the intensity of the incoming or emitted light, the polarity of the incoming or emitted light, the wavelength of the incoming or emitted light, the focus of incoming or emitted light, etc. Typically, the spatial light modulator may modulate the amplitude of the light rays. However, some spatial light modulators may modulate the phase of the light rays. The spatial light modulator used herein, may modulate the amplitude of the collimated light beam and may provide it towards the first direction. In one or more examples, the spatial light modulator may be controlled by the control logic or control unit which synchronizes operation of the light source and the spatial light modulator.

Optionally, the spatial light modulator is selected to be at least one of a reflective spatial light modulator, a transmissive light modulator. Examples of the reflective spatial light modulator, include, but are not limited to, a digital micromirror device. Typically, the display system comprises the reflective type spatial light modulator that may be two-dimensional and may modulate the collimated light beam directed towards an active region of the spatial light modulator through a prism assembly. The reflective spatial light modulator can be a high image refresh-rate capable digital micromirror device (DMD). Alternatively, it can be a fast-switching liquid crystal on silicon (LCoS) or ferroelectric liquid crystal on silicon FLCoS type modulator. In another embodiment it is possible to achieve the same effect with the transmissive type spatial light modulator.

Optionally, the spatial light modulator is selected to be at least one of a digital micromirror device, a liquid crystal on silicon (LCoS), a ferroelectric liquid crystal on silicon (FLCoS) modulator, a liquid crystal display micro-panel. The digital micromirror device (DMD) may have a high-refresh-rate and may be composed of electrically addressable matrix of microscopic mirrors corresponding to a pixelated structure of the 3D image. The liquid crystal on silicon (LCoS) may be a high refresh rate miniature composed of a silicon backplane on which the liquid crystal layer is deposited. The ferroelectric liquid crystal on silicon (FLCoS) modulator may be a silicon backplane on which the ferroelectric liquid crystal may be deposited. Herein, the term "ferroelectric" may refer to materials that may possess spontaneous electric polarization characteristic. It may be appreciated that, the digital micromirror device, the liquid crystal on silicon (LCoS) and the ferroelectric liquid crystal on silicon (FLCoS) modulator may be the reflective spatial light modulator; and the liquid crystal display micro-panel may be the transmissive spatial light modulator.

It must be noted, that the configuration of the spatial light modulator may imply absence of the prism assembly. This may be more common for utilization of the digital micromirror devices. Nevertheless, this may not be a typical case of application of the display system. In an embodiment, the spatial light modulator is the liquid crystal on silicon (LCoS) and the prism assembly is a polarization sensitive beam splitter cube. Due to highly collimated nature of the collimated light beam after modulation by the spatial light modulator, shape of the collimated light beam doesn't change notably. That is, the degree of collimation is preserved. This enables a virtually focus free lens-less projection system. In other words, no additional projection lens may be required.

It may be appreciated that, the 2D images formed by the spatial light modulator may be very small and may not be suitable to be viewed directly. As the spatial light modulators, typically, are small micro display devices, for practical utilization, the formed 2D images may have to be magnified or enlarged.

The display system comprises a first optical image expander inclined at a first angle 'α' in respect to the first direction. The first optical image expander is employed to reflect the modulated light beam to a second direction. Herein, the first optical expander may be a reflective Fresnel-type mirror surface used for expanding the 2D image in one dimension. Thus, the image with a total height of "a" may be expanded to have an expanded length a', where a<a', by employing the first optical image expander unit. The Fresnel-type mirror surface may be a first micro-patterned surface that may be slanted at the first angle 'α' in respect to the first direction. Herein, the first direction may be an optical image axis of the light beam from the spatial light modulator. Typically, a pattern pitch of the first optical image expander is comparable to pixel size of the spatial light modulator.

The display system comprises a second optical image expander inclined at a second angle 'β' in respect to the second direction. The second optical image expander is on an optical path after the first optical image expander and employed to reflect the reflected light beam to a third direction. That is, after the first reflection from the first optical image expander, the modulated light beam may be directed towards the second optical image expander, which in turn reflects the reflected light beam to the third direction. The second optical image expander is similar to the first optical image expander and may be the reflective Fresnel-type mirror surface comprising a second micro-patterned surface that is positioned at the second angle 'β' in respect to the second direction. As discussed, the first optical image expander expands the image in only one direction and directs the modulated light beam towards the second direction. Nevertheless, it is required to expand image in both directions. The second optical image expander, herein, expands the image in another direction and hence, ensure full 2D image expansion.

It may be appreciated that the first optical image expander and the second optical image expander may be realized of organic or inorganic materials using moulding, lithography, etching or other suitable manufacturing methods. The materials used for the formation of surface relief can be of mineral glass, acrylic glass, polycarbonate, or similar, as well as metal, such as, aluminium and its alloys, magnesium and its alloys, titanium and its alloys. For the improved reflectance, the surfaces may be coated with thin film reflective coatings of either metallic mirror or a stack of broadband dielectric mirror, preferably ensuring reflectance values of 98% or more over the whole visible spectrum at a target incidence-reflection angle.

Optionally, each of the first angle 'α' and the second angle, is from 1 up to 10 degrees. Each of the first angle 'α' and the second angle 'β' can be from 1, 2, 3, 4, 5, 6 degrees up to 5, 6, 7, 8, 9, 10 degrees. Depending on required image expansion, the first angle 'α' and the second angle 'β' may be varied. When larger image expansion is needed, the first angle 'α' and the second angle 'β' may be decreased. However, it may be noted that in such case the total length of an optical image expander arrangement comprising the first optical image expander and the second optical image expander may increase. Alternatively, when smaller image expansion is needed, the first angle 'α' and the second angle 'β' may be increased. The given range of 'α' and 'β' between 1° to 10° works for most of the practical scenarios. However, it may be appreciated that if a very small image from the spatial light modulator is desired to be enlarged, the first angle 'α' and the second angle 'β' may go below 1 degree. Similarly, if the desired image expansion is much smaller; that is, if there is no need for high image expansion, the upper boundary for the first angle 'α' and the second angle 'β' may go up higher than 10 degrees, without any limitations.

It may be appreciated that, in case the spatial light modulator, responsible for the modulation of light and outputting image information, has the cross-sectional dimensions of x and y, the dimensions of the collimated light beam would also be x and y. In said configuration the dimensions of the magnified image are expressed as:

$$x' = \frac{y}{\tan(\alpha)}$$
$$y' = \frac{x}{\tan(\beta)}$$

To preserve an aspect ratio of the original image, the size of the first optical image expander and the second optical image expander and their corresponding first angle 'α' and second angle 'β' may be chosen accordingly. Nonetheless, if the expanded image is configured to have unnatural image aspect ratio, with said configurable parameters, a normal aspect ratio of the resulting magnified image can be achieved.

The first optical image expander comprises a first micropatterned surface comprising at least a first facet and at least a second facet inclined in respect to the at least first facet, at least a first pitch comprising the at least first facet and the at least second facet, wherein the at least first facet is inclined at a third angle 'γ' in respect to the first direction and at least part of the at least first facet is reflective. Herein, the first micropatterned surface may be defined as a surface comprising one or more micropatterns, for example in the form of ridges, elevations and the like. The facet herein may refer to one of the sides in the micropatterned surface. The first facet, in the first micropatterned surface, may correspond to a first side and the second facet, in the first micropatterned surface, may correspond to a second side therein. Herein, the first facet and the second facet may be non-colinear, with the second facet being inclined with respect to the first facet. In particular, the second facet may be inclined with respect to the first facet to form a generally triangular (or tooth) shape in the first micropatterned surface. Herein, the first pitch is defined as the distance between two crests in the first micropatterned surface in the first optical image expander. Alternatively, the first pitch is defined as the distance between tips of two adjacent micropatterns in the first optical image expander.

As discussed, the first facet is inclined at the third angle 'γ' in respect to the first direction. Herein, the first direction is the direction of the modulated light beam striking the first optical image expander. It may be contemplated that due to the triangular shape of the first micropatterned surface, some part of the first facet would be under the shadow of the second facet in respect to the modulated light beam striking the first optical image expander. Hence, the modulated light beam may only strike at a part (or portion) of the first facet, specifically near a tip thereof. Hence, only part of the first facet that is not under the shadow is required to be made reflective so that when the modulated light beam hits the first facet, it is reflected towards the second direction. The other part of the first facet which is under shadow may have light absorbing coating so that it does not facilitate any unwanted reflections. Similarly, the second facet, which does not receive and reflect the modulated light beam, may have light absorbing coating so that it does not facilitate any unwanted reflections. Although, in some embodiments, the entire first optical image expander with the micropatterns is made of reflective surfaces for ease of manufacturing and cost-effectiveness.

The second optical image expander comprises a second micropatterned surface comprising at least a third facet and at least a fourth facet inclined in respect to the at least third facet, at least a second pitch comprising the at least third facet and the at least fourth facet, wherein the at least third facet is inclined at a fourth angle 'δ' in respect to the second direction and at least part of the at least third facet is reflective. Similar to the first optical image expander, the second optical image expander comprises the second micropatterned surface. The second micropatterned surface, similar to the first micropatterned surface, may comprise the third facet and the fourth facet, with the fourth facet being slanted with respect to the third facet so as to form a generally triangular shape. Herein, the second pitch is defined as the distance between two crests in the second micropatterned surface in the second optical image expander. Alternatively, the second pitch is defined as the distance between tips of two adjacent micropatterns in the second optical image expander.

It may be appreciated that the first pitch and the second pitch may be much larger than that of the spatial light modulator. This may be better understood by taking the example of the first micropatterned surface. Each pixel of the spatial light modulator may reflect from each tooth of the first micropatterned surface. Typically, as discussed, the first micropatterned surface may be inclined at an angle of about 1-10 degrees. Hence, the typical pitch of the optical image expander would correspond to the pitch of the spatial light modulator divided by sin(a). In an example, the smallest pitch of the spatial light modulator may be considered around 4 micrometres. The smallest pitch of the first micropatterned surface would be achieved at larger inclination angles of about 10 degrees. As, Sin (10)=0.17; therefore, Pitch=4/0.17=23.5 microns. For real-world case, with the pitch of the spatial light modulator being about 7 micrometres and inclination angle for first micropatterned surface being about 4 degrees, the pitch of the micropatterned may come to around 100 micrometres (calculated, as above) which is considerably more than the pitch of the spatial light modulator. Thus, it may be understood that the smaller pitch of any of the first micropatterned surface and the second micropatterned surface may result in diffraction of the incident light beam thereon, which is undesirable. Hence, the first pitch of the first micropatterned surface and the second pitch of the second micropatterned surface may generally be larger than the pitch of spatial light modulator.

The light beam reflected from the first optical image expander may travel in the second direction towards the second optical image expander. As discussed, the third facet is inclined at the third angle 'δ' in respect to the second direction. It may be contemplated that due to the triangular shape of the second micropatterned surface, some part of the third facet would be under the shadow of the fourth facet in respect to the received light beam striking the second optical image expander. Hence, the light beam may only strike at a part (or portion) of the third facet, specifically near a tip thereof. Hence, only part of the third facet that is not under the shadow is required to be made reflective so that when the modulated light beam hits the third facet, it is reflected therefrom. The other part of the third facet which is under shadow may have light absorbing coating so that it does not facilitate any unwanted reflections. Similarly, the fourth facet, which does not receive and reflect the modulated light beam, may have light absorbing coating so that it does not facilitate any unwanted reflections. Although, in some embodiments, the entire second optical image expander with the micropatterns is made of reflective surfaces for ease of manufacturing and cost-effectiveness.

Optionally, at least one of the first facet, the second facet, the third facet and the fourth facet is selected from at least one of a flat facet, a curved facet. Typically, the first facet, the second facet, the third facet and the fourth facet may be flat facets. The flat facets reflect light beam in the visible spectrum with high efficiency. The curved facets may be employed for reflecting divergent light beam. Particularly, the curved facet may be used to compensate for divergence angle and/or provide assistance with improved image fill-factor within the projection volume. The embodiments of the present disclosure have been described in consideration of the first facet, the second facet, the third facet and the fourth facet being the flat facets; however, it may be contemplated by a person skilled in the art that the described embodiments may be applicable with the first facet, the second facet, and/or the third facet and/or the fourth facet being curved facets with slight modifications.

Optionally, each of the third angle 'γ' and the fourth angle 'δ' is 45 degrees. As discussed, the first facet is inclined at the third angle 'γ' in respect to the first direction and the third facet is inclined at the fourth angle 'δ' in respect to the second direction. A typical case for practical application involves orthogonal configuration. In such case, the light beam received at the first optical image expander, in the first direction, may be reflected to travel orthogonally to the first direction towards the second optical image expander, in the second direction; and further reflected to travel orthogonally to the second direction away from the second optical image expander, along the third direction. For achieving this, each of the third angle 'γ' and the fourth angle 'δ' is substantially equal to 45 degrees. In this case, the reflection follows rules of geometrical optics which is, an angle of incidence is equal to an angle of reflectance.

In operation, the first optical image expander is positioned at the first angle 'α' in respect to incident modulated light beam, with the first facet, which is the reflecting facet, being arranged at the third angle 'γ' in respect to the modulated light beam. When manufacturing the first optical image expander, the first angle 'α' at which the first optical image expander will be inclined may be known to account for a correct choice of the third angle 'γ' in order to ensure the desired direction of reflection which is the second direction for the first optical image expander.

The peculiarity of the disclosed geometry for the first optical image expander unit is that for operation the pitch of the first optical image expander isn't a detrimental factor. The first optical image expander may work with smaller first pitch as well as with larger first pitch. The differences determining a particular choice of the first pitch of the first optical image expander is regulated by light diffusing characteristics of a screen element (as discussed later in more detail) arranged on the optical path after the second optical expander. As discussed, for the first optical image expander, only a fraction of the first facet may be effectively utilized for the redirection of the modulated light beam. Some part of the first facet may be in the shadow of the previous facet and thus may not participate in reflection effectively. As a consequence, there may be discontinuities in the magnified image. Thus, when the modulated light beam strikes the first facet, only a small portion of the modulated light beam may be reflected. The reflected light beam may correspond to a useful image information within the magnified image. Rest of the modulated light beam, which may be regulated not to carry image information, may not be reflected and may correspond to a shadow region in the magnified image. As the first angle 'α', which is the angle of inclination for the first optical image expander, decreases; an effective linear fill factor of the magnified image, which is ratio of useful image information to the shadow region, also decreases. In order to determine the effective linear fill factor of the magnified image, which is not dependent on the pitch of the first micropatterned surface, a following equation may be applicable, $$\frac{\text{useful information}}{\text{shadow region}} = \frac{\tan(\gamma)}{\tan(\alpha)}$$

For example, if the third angle 'γ' is equal to 45° and the first angle 'α' is equal to 2°, then the effective linear fill factor of the magnified image is 3.5%. When the first pitch of the first micropatterned surface is finer, the effective linear fill factor of the magnified image may be such that the gaps between adjacent image elements are less. It may be understood that, though no image information is lost, if the spacing between adjacent image elements is large and the scattering power of the projection volume is low, the resultant magnified image may have perceivable artefacts associated to blank spaces. In this aspect, it is more desirable to use the first optical image expander and the second optical image expander with finer pitch to reduce the gaps between adjacent image elements. In such way, the light scattering within the diffuser elements of the projection volume will facilitate merging of the image elements into smoothed image which may have a more pleasing perceived image quality. It may be appreciated that the teachings of the first micropatterned surface may be also applicable to the second micropatterned surface, without departing from the scope of the present disclosure.

The display system comprises a screen element arranged on the optical path after the second optical expander. The screen element herein, refers to a display meant for displaying the image information received from the second optical image expander. It may be appreciated that the screen element may be positioned along the third direction. For the purposes of the present disclosure, the screen element has also been referred to as "projection volume" and the two terms have been interchangeably used without any limitations.

Optionally, the screen element comprises two or more image projection planes and the system comprises a controller configured to synchronize operation of the light source, the spatial light modulator and the screen element to provide respective image plane information to the two or more respective image planes of the screen element. Throughout the present disclosure, the term "projection planes" relates to an optical component that, in operation, displays a given image depth plane thereupon. Notably, the 3D image may have at least two image depth planes. Hence, the screen element may comprise at least two projection planes. The controller may synchronize the light source, the spatial light modulator and the screen element. Herein, the screen element may receive a projection of the given image depth plane to display graphical information represented in the given image plane at the given projection plane in synchronization with the light source and the spatial light modulator.

As discussed, in order to display the 3D image, the 3D image may be divided into two or more two-dimensional (2D) image slices that may be referred as the 'image information'. The image information corresponds to said image slices which in turn, corresponds to each of a planar portion of the 3D image. Such image slices of an object when put together enable the display of the 3D image, such that the viewer may perceive the depth of the object displayed within the 3D image. The image slice may be represented at different focal distances with respect to the viewer, such that the viewer perceives the depth corresponding to the multiple depth planes of the image.

Optionally, the screen element is a multi-plane volumetric display comprising a plurality of display elements. The plurality of display elements may be comprised of 2 to 40 individual optical diffuser elements which may be separated by some distance from one another. In some examples, spacers may be utilized to displace the adjacent display elements in depth. Herein, the display elements are placed at different focal distances with respect to the viewer. This way a projection volume may be discretized and addressed in a time-sequential manner. The 2D image slices may be presented on these display elements at different focal distances so as to generate the 3D image.

Optionally, the plurality of display elements comprise at least one liquid-crystal based optical diffuser element configured to have two optical states: the first optical state comprising high light transmission and the second optical state comprising high haze values. Throughout the present disclosure, the term "optical diffuser" relates to the optical component that, in operation, displays the given image depth plane thereupon. The first optical state represents high light transmission, and in such first optical state, the respective optical diffuser element is transparent. Thereby, in the first optical state, the light beam passing through the optical diffuser element may not interact with medium of the optical diffuser element and hence, no image information may be presented on the optical diffuser element in the first optical state. Further, the second optical state represents high haze values, and in such second optical state, the respective optical diffuser element is opaque. Thereby, in the second optical state, the optical diffuser element interacts with the incident visible light beam by greatly scattering it and hence, the image information is presented on the optical diffuser element in the second optical state.

As discussed, when the optical diffuser element is configured in the first optical state, the incident light beam travels through it without substantial interaction; whereas, when the optical diffuser element is configured in second optical state, the incident light beam is scattered, allowing to observe the image from a wide viewing angle, if the image is focused at a given physical distance. It may be appreciated that at a given instant of time all but one optical diffuser element in the projection volume may be configured in the first optical state and a single optical diffuser element may be configured in the second optical state. Further, synchronous with it, a projection system, herein the light source, may project the corresponding 2D image slice upon the optical diffuser element in the second optical state. In a following instant of time, the projection system may be switched off and the projection volume may be reconfigured. Herein, the only optical diffuser element may be configured from the second optical state to the first optical state and the adjacent optical diffuser element may be configured from the first optical state to the second optical state. The projection system may be then reenabled to project a new 2D image slice towards the given optical diffuser element in the second optical state. The process may be continuously repeated and all of the optical diffuser element may be cycled through the second optical state to recreate a perceivably 3D image in the given projection volume. The configuration of the optical diffuser elements may be carried out by application of voltage. Herein, the applied voltage may correspond to the first optical state and no applied voltage may correspond to the second optical state.

Optionally, the liquid-crystals of the at least one liquid-crystal based optical diffuser element are polymer free cholesteric liquid crystals. The polymer free cholesteric liquid crystals, typically used in such optical diffuser elements may ensure fast transition from the first optical state to the second optical state, and inversely from the second optical state to the first optical state. The transition may be in the order of hundreds of microseconds, such as 200 to 600 microseconds.

Alternatively, in order to counter possible image artefacts associated to focus-free image expansion or magnification, the optical diffuser elements of the projection volume may have a composite structure. It may be appreciated that the scattering power of the optical diffuser element may be associated to the thickness of the active layer that may be the liquid-crystal layer. Thus, a thicker active layer may smooth a projected image to a higher degree and hence, may help in hiding image artefacts associated to blank spaces introduced by the image expansion (using the combination of the first optical image expander and the second optical image expander, as discussed above). Nevertheless, thicker active layers may require higher driving voltage which may be undesirable in some cases, for example in portable display systems which reply on battery for power supply.

Optionally, the at least one liquid-crystal based optical diffuser element comprises at least two active diffuser layers. Herein, the optical diffuser element comprising at least two active diffuser layers may be referred to as a composite optical diffuser element. The two active diffuser layers may be a first active diffuser layer and a second active diffuser layer. The composite optical diffuser element may further comprise two outermost substrates along with an internal substrate. Typically, all substrates may be made of mineral glass. Specifically, all substrates may be a high clarity display glass. Alternatively, the substrate may be implemented as polymer substrates. The outermost substrates may be made of thicker material to provide rigidity to the overall structure. The range of thickness for outermost substrates typically lies within 0.4-1.1 millimetres. However, when the projection volume is implemented by way of laminating together individual optical diffuser elements, the thickness of the outermost substrates may go beyond 1.1 millimetres in order to ensure specific gap between target active layers. The internal substrate may be a thin dielectric layer separating two active liquid crystal layers. Typically, the internal substrate may be chosen as thin as possible. For example, the internal substrate may be a film like substrate with a thickness of 100 to 300 micrometres. The internal substrate may be coated on both sides with the transparent conductor such as, but no limited to, transparent electrode of indium tin oxide (ITO) and doped zinc oxide (ZnO). The outer substrates may be also coated with transparent electrode facing the active layers. Furthermore, the first active diffuser layer may be positioned in the direction of the incident light beam and may be configured to be a pre-scattering layer. The first active diffuser layer may be considerably thinner than the second active diffuser layer. For example, typical range of thicknesses for the first active diffuser layer is 1-6 micrometres. In contrast the second active diffuser layers may be considerably thicker and may have thickness from 7 to 25 micrometres. The thickness of both the active layers is determined by spacers, such as deposited spheres or photospacers as known in the art. In present examples, the active layers may be contained within liquid crystal cells by applying a polymer gasket along the perimeter.

In operation, the incident light beam carrying image information attributed to the image may be pre-scattered by the first thinner active diffuser layer. As this is a thin layer, the scattering power is weak and a scattering cone is narrow. Then the pre-scattered light beam through the internal substrate enters the second active diffuser layer which forms the corresponding image depth plane and has strong light scattering properties. The pre-scattered light ensures a higher fill-factor of the image. Thus, even when the image is magnified, it is perceived as the smooth image. With such architecture of single optical diffuser element, it is possible to counter the image artifacts attributed to a low image fill-factor and limit the maximum required voltage to efficiently drive the optical diffuser elements. Moreover, in present examples, lowering the electric field intensity also minimizes radio frequency (RF) emissions, which leads to an added advantage.

In other words, first the active layer (image depth plane) is initiated to transition from the first optical state to the second optical state. Then, the pre-scattering layer is configured to transition from the first optical state to the second optical state. A delay is introduced to ensure image depth plane has reached the second optical state. Thereafter, the spatially modulated light (image) is projected towards the pre-scattering layer. Afterwards, the light source (of the projection unit) is disabled for a while. Subsequently, the said image depth plane is initiated to transition from the second optical state to the first optical state. Then, the pre-scattering layer is configured to transition from the second optical state to the first optical state. The whole process is repeated with the following diffuser element of the projection volume.

The volumetric display system of the present disclosure is comprised of light source enabling substantial collimation of the emitted light beam such as, the laser or the SLED, optionally the first optics for forming, shaping and/or collimating the light beam, the first optical image expander and the second optical image expander which typically, are of reflective type such as, the DMD and the LCoS or technically, may be of transmissive type such as the, LCD. Furthermore, the first optics or any other suitable optics may be used as beam expanding optics to match the aperture of the spatial light modulator. Herein, the light beam is directed towards the first optical image expander which typically is a thin strip of Fresnel-type mirror array whose smallest dimensions substantially corresponds to the respective dimension of the spatial light modulator. As the modulated light beam is expanded in one of the directions and reflected, it hits the second optical image expander whose size is comparable to the size of the cross-section of the projection volume. A resulting expanded light beam is then reflected from the second optical image expander and directed towards the projection volume, where due to light scattering it is visualized at a certain physical depth. As the first optical image expander and the second optical image expander are positioned at low or very low angles in respect to the incident light rays, the overall footprint of the display system becomes compact. In contrast, in prior art, to ensure an image of similar size, the technical solution foresaw a utilization of projection lens including large format parabolic of freeform reflectors, which though contributing to a reduction of the overall footprint still is considered bulky. The display system described herein improves substantially on image quality, which is not substantially perturbated by application of image expander units and overall footprint of said volumetric display arrangement.

Optionally, additional beam forming optics between spatial light modulator and the first optical image expander may be employed. Alternatively, secondary beam-forming optics can be placed between the second optical image expander and the projection volume. Furthermore, the volumetric display system contains control logic interfacing light sources, projection volume, spatial light modulator and external image source and ensuring synchronous operation to output perceptually 3D images. Optionally, there might be additional optical arrangements applied on the path of light prior to the projection volume. These can include, but not limited to, a holographical optical element, a holographic diffuser element, a micro-lens (lenslet) array an optical meta-surface with tailored optical properties to mimic functionality of either a controlled diffuser and/or lenslet array.

The display system of the present disclosure may be employed in a number of applications. For instance, it may be used as a direct view volumetric displays which conventionally suffer from large form-factor, are bulky and might require optically complex projection lens and adjacent optical components to ensure reasonable footprint.

Optionally, a head mounted display system comprises the display system as disclosed above. As per embodiments of the present disclosure, the "head mounted display system" is a display device which may be worn by the user, e.g. a part of a helmet to be worn on a head of the wearer. The head mounted display system includes the display system in front of one or each eye and may provide a 3D view in the virtual-reality environment and the augmented-reality environment. The head mounted display system may be used in applications such as, but not limited to, military, aviation, gaming, virtual cinema and medicine. Herein, the projection volume may be reimaged by secondary image forming optics such as, the eyepiece. In a case for augmented reality display, the image combiner may be also included. The image combiner may be a type of semi-reflective beam splitter allowing reflection of projected light and transmission of ambient light. Alternatively, the eyepiece and the image combiner may be a single unit, for example, a curved beam splitter such as, an aspherical or a freeform beam splitter. In some examples, the image source may be coupled with a refractive waveguide.

Optionally, a head up display system comprise the display system as disclosed above. The head up display system are displays that are positioned in line of sights of pilots and drivers, and provide vital information thereto. That is, the head up display system employing the display system of the present disclosure may be employed in the automobiles. There is always a battle to save space in the dash of the automobiles and, thus a display system with minimum footprint is desired. Since the display system of the present disclosure is compact, it may be employed for the head up displays in the automobiles and other similar application. Traditionally, a head up display system, typically cannot convey 3D information that is perceived at different depths. A multi-focal architecture based on a volumetric display technology may solve this. However, multi-focal architecture is considerably bulky and may require a large volume in the dash of a vehicle, for example. By employing the display system of the present disclosure, the multi-focal engine may be realized in a thin form factor. Herein, the display system, equivalent to a direct-view volumetric display may be coupled with secondary optics to yield multiple virtual image depth planes. The display system herein, may essentially be a scaled-down version of the volumetric direct-view display with similar components. In addition, the display system may be complemented by secondary imaging optics such as, an eyepiece and an image combiner. The eyepiece may be implemented as a part of the image combiner. In one embodiment the eyepiece is a separate lens or lens assembly such as, but not limited to, Fresnel lens or multiple Fresnel lenses, holographic lens(s), diffractive lens(s), meta surface lens(s), refractive lens(s) or any combination thereof. The image combiner may be a windshield that may coated with the semi-reflective coating. The windshield may be also coated with notch-type reflection coating that may effectively reflect narrow wavelengths of the image source, transmit the inverse spectral region and wide wavelength regions and thus, contribute to a highly transparent and unobstructive windshield. In alternative embodiment, the functionality of the eyepiece may be directly embedded within the windshield in a form of wavelength selective holographical optical element, diffractive optical element or the optical meta surface.

Moreover, the present description also relates to the method for displaying the 3D image as described above. The various embodiments and variants disclosed above apply mutatis mutandis to the method for displaying the 3D image.

Optionally, each of the first angle 'α' and the second angle 'β' is from 1 up to 10 degrees.

Optionally, each of the third angle 'γ' and the fourth angle 'δ' is 45 degrees.

Optionally, the light beam has a divergence angle less than 1.5 degrees after collimating the light beam in the first optics.

DETAILED DESCRIPTION OF THE DRAWINGS

Referring to FIG. 1, illustrated is a block diagram illustration of a display system 100 for displaying a three-dimensional image, in accordance with an embodiment of the present disclosure. The display system 100 comprises of a light source 102, a first optics 104, a spatial light modulator 106, a first optical image expander 108, a second optical image expander 110, a screen element 112 and a controller 114. The light source 102 is employed to emit a light beam towards the first optics 104. The first optics 104 is employed to expand, shape, form and/or collimate the light beam and provide the collimated light beam towards the spatial light modulator 106. The spatial light modulator 106 is employed to modulate the collimated light beam. The modulated light beam is provided to a first direction. The first optical image expander 108 is inclined at a first angle 'α' in respect to the first direction. The first optical image expander 108 is employed to reflect the modulated light beam to a second direction. The second optical image expander 110 is inclined at a second angle 'β' in respect to the second direction. The second optical image expander 110 is on the optical path after the first optical image expander 108 and is employed to reflect the reflected light beam to a third direction. The screen element 112 is arranged on the optical path after the second optical expander 110. The controller 116 is configured to synchronize operation of the light source 102, the spatial light modulator 106 and the screen element 112 to provide respective image plane information to the two or more respective image planes of the screen element 112.

Figure 2:
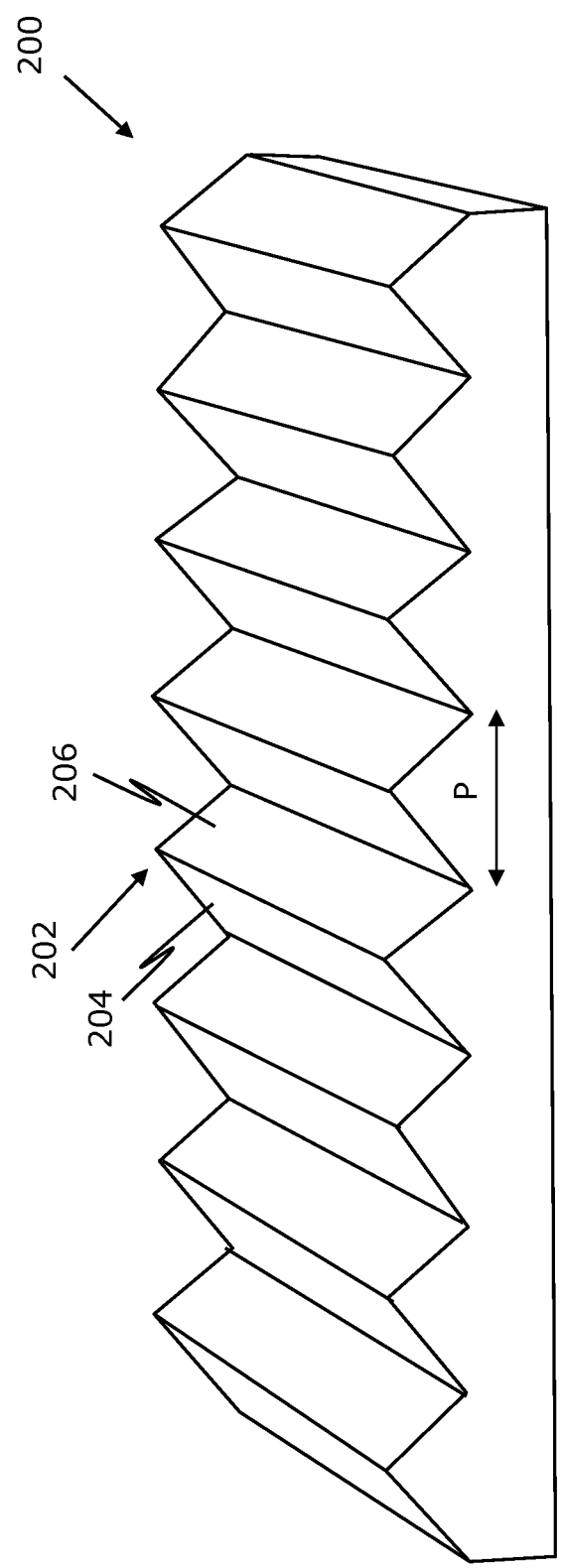
FIG. 2 is a diagrammatic illustration of a first optical image expander for the display system of FIG. 1, in accordance with an embodiment of the present disclosure.

Referring to FIG. 2, illustrated is a diagrammatic illustration of a first optical image expander 200 for the display system (such as, the display system 100 of FIG. 1), in accordance with an embodiment of the present disclosure. As illustrated, the first optical image expander 200 is implemented by way of fine surface grating such as, a Fresnel type mirror. The first optical image expander 200 comprises a first micropatterned surface 202 with a first facet 204 and a second facet 206. Herein, a pitch P of the first micropatterned surface 202 comprises the first facet 204 and the second facet 206. In the present disclosure, the second optical image expander is similar in configuration to the first optical image expander 200, and the second micropatterned surface therein is similar in configuration to the first micropatterned surface 202, with a third facet and a fourth facet therein being similar to the first facet 204 and the second facet 206 of the first micropatterned surface 202 of the first optical image expander 200.

Figure 3:
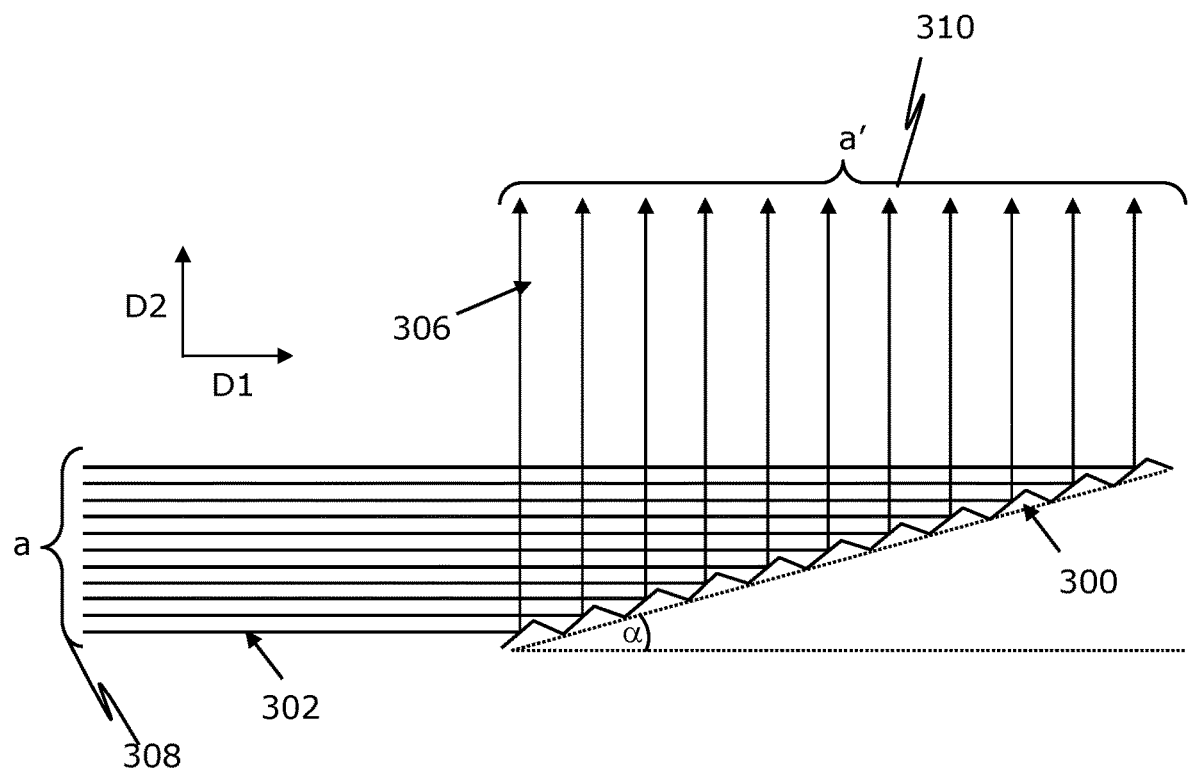
FIG. 3 is a schematic illustration of the first optical image expander of FIG. 2 depicting reflection of a modulated light beam therefrom, in accordance with an embodiment of the present disclosure.

Referring to FIG. 3, illustrated is a schematic illustration of the first optical image expander 300 (similar to the first optical image expander 200 of FIG. 2) depicting reflection of a modulated light beam therefrom, in accordance with an embodiment of the present disclosure. The first optical image expander 300 is positioned at a first angle α in regards to a first direction D1 of a collimated light beam 302 carrying image information. Depending on the required image expansion, the first angle α is varied. Herein, when the collimated light beam 302 hits the first optical image expander 300, it is reflected towards a second direction D2. It may be observed that an input image with a total height "a" (as shown) is expanded to have an expanded image of length "a" (as shown), such that a<a'.

Figure 4:
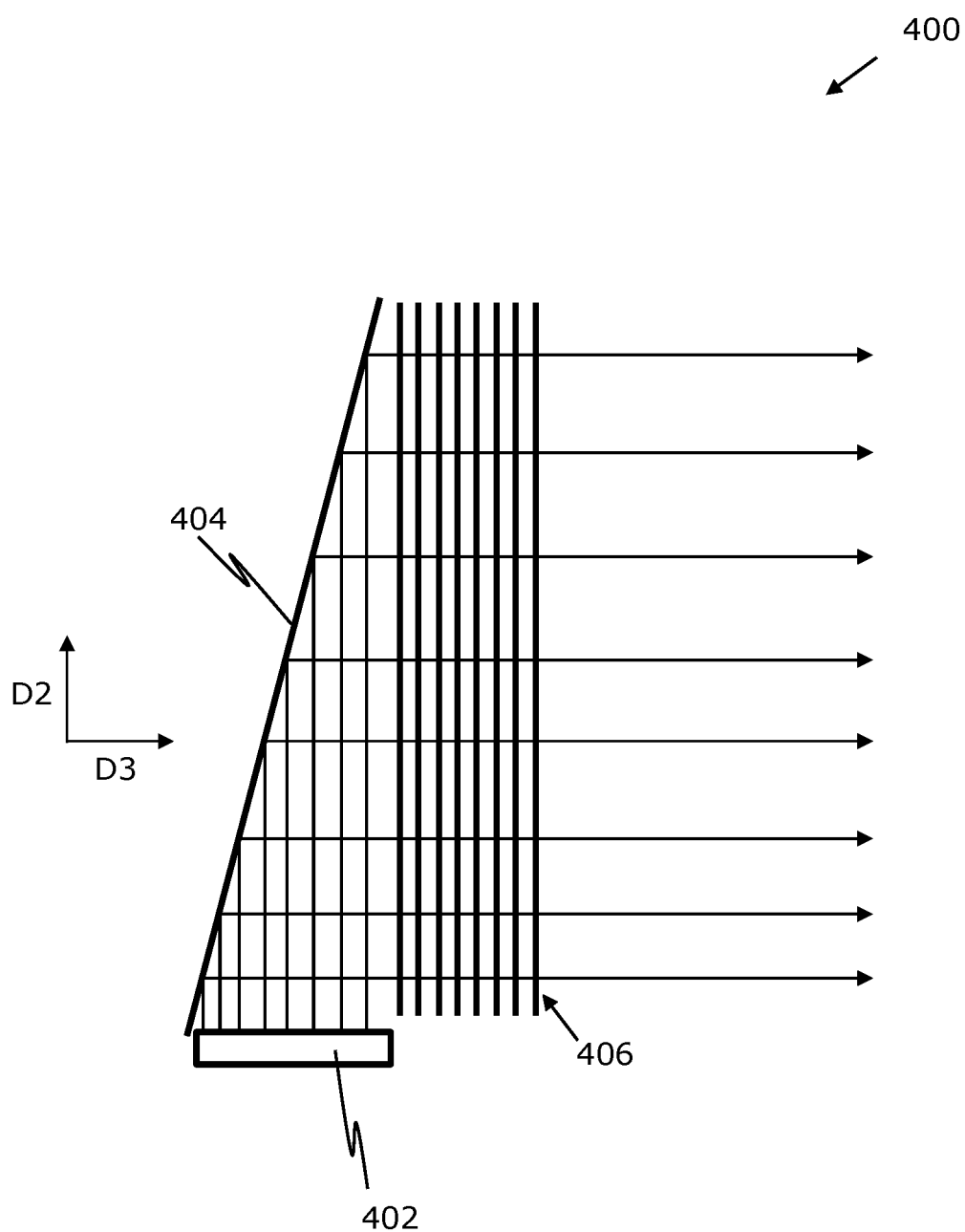
FIG. 4 is a schematic illustration of a portion of the display system implementing the first optical image expander and a second optical image expander along with a projection volume for displaying the three-dimensional image, in accordance with an embodiment of the present disclosure.

Referring to FIG. 4, illustrated is a schematic illustration of a portion of the display system 400 implementing a first optical image expander 402 (similar to the first optical image expander 300 of FIG. 3) and the second optical image expander 404 along with a projection volume 406 for displaying the three-dimensional image, in accordance with an embodiment of the present disclosure. As shown, the first optical image expander 402 reflects the modulated light beam towards the second direction D2. The second optical image expander 404 reflects the reflected light beam towards a third direction D3. The projection volume 406 is positioned in the third direction 410 and hence, when the light beam travels in the third direction 410, it hits the screen element of the projection volume 406 to form the 3D image. Herein, the first optical image expander 402 and the second optical image expander 404 ensure full 2D image expansion and direction towards the projection volume 406 of the display system 400.

Figure 5A:
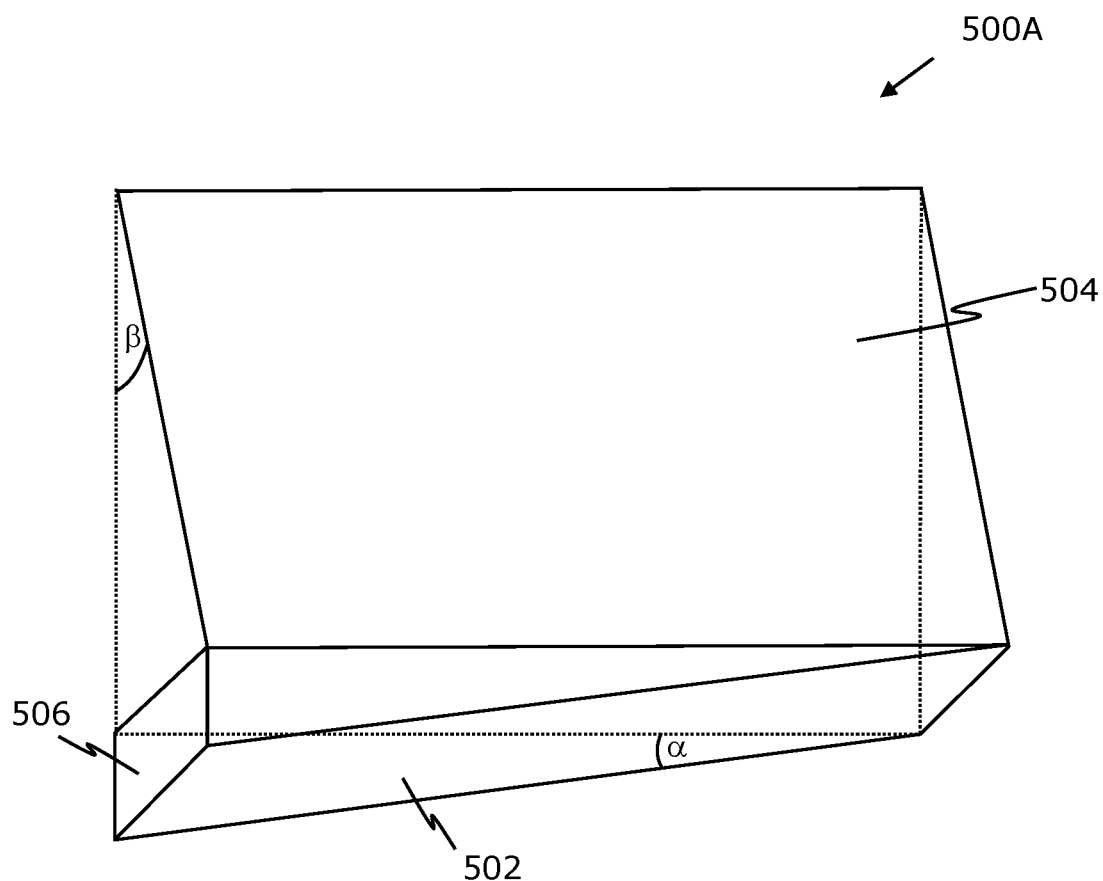
FIG. 5A is a diagrammatic illustration of an optical image expander arrangement comprising the first optical image expander and the second optical image expander, in accordance with an embodiment of the present disclosure.

Referring to FIG. 5A, illustrated is a diagrammatic illustration of an optical image expander arrangement 500A for a display system (such as, the display system 400 of FIG. 4), in accordance with an embodiment of the present disclosure. The optical image expander arrangement 500A comprises a first optical image expander 502 and a second optical image expander 504. Herein, a modulated light beam carrying image information enters through an aperture 506, which may be a virtual abstract aperture or an actually physical aperture. The modulated light beam is directed towards the first optical image expander 502 which is positioned at a first angle α in respect to the first direction of modulated light beam propagation. From the first optical image expander 502, the light beam is linearly expanded in one dimension and is reflected towards the second optical image expander 504, which is positioned at the second angle β in respect to the propagation direction of the reflected light beam reflected from the first optical image expander 502.

Figure 5B:
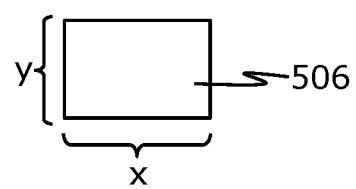
FIG. 5B is a cross-sectional view of an aperture of FIG. 5A, in accordance with an embodiment of the present disclosure.

Referring to FIG. 5B, illustrated is a cross-sectional view of the aperture 506 of FIG. 5A, in accordance with an embodiment of the present disclosure. The dimension of the aperture is given with a length x and a breadth y. It may be appreciated that the spatial light modulator (such as the spatial light modulator 106 of FIG. 1) responsible for the modulation of light and outputting image information also has the cross-sectional dimensions of x and y, and thus the dimensions of the collimated light beam would also be x and y.

Figure 5C:
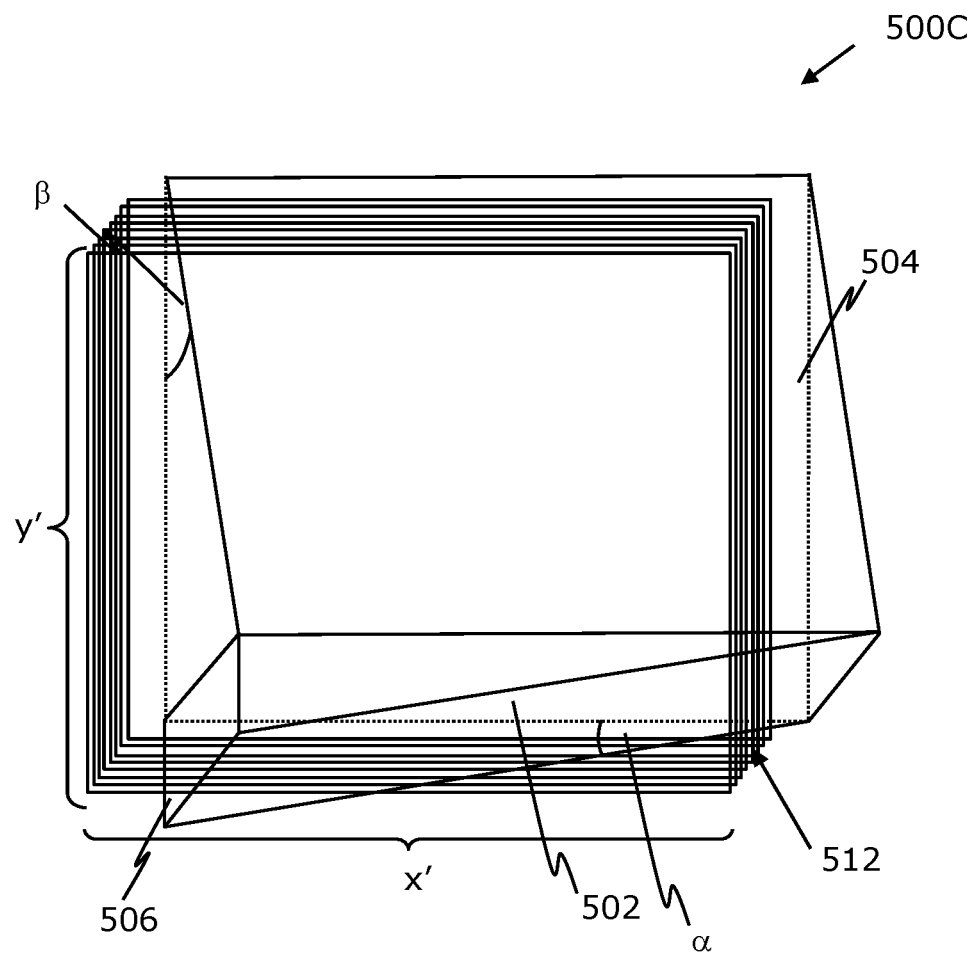
FIG. 5C is a diagrammatic illustration of a portion of a display system comprising the optical image expander arrangement with a projection volume, in accordance with an embodiment of the present disclosure.

Referring to FIG. 5C, illustrated is a diagrammatic illustration of a portion of a display system 500C (such as, the display system 400 of FIG. 4) comprising the optical image expander arrangement (such as, the optical image expander arrangement 500A of FIG. 5A) with a projection volume 512, in accordance with an embodiment of the present disclosure. Herein, the configuration of the first optical image expander 502 and the second optical image expander 504 is complemented by the projection volume 512 for displaying a three-dimensional image. Herein, it may be seen that the expanded image displayed on a layer of the projection volume 512 has a length x' and a breadth y'. In said configuration the dimensions of the magnified image are expressed as:

$$x' = \frac{y}{\tan(\alpha)}$$
$$y' = \frac{x}{\tan(\beta)}$$

To preserve an aspect ratio of the original image, the size of the first optical image expander 502 and the second optical image expander 504 and their corresponding first angle α and second angle β may be chosen accordingly. Nonetheless, if the expanded image is configured to have unnatural image aspect ratio, with said configurable parameters, a normal aspect ratio of the resulting magnified image can be achieved.

Figure 5D:
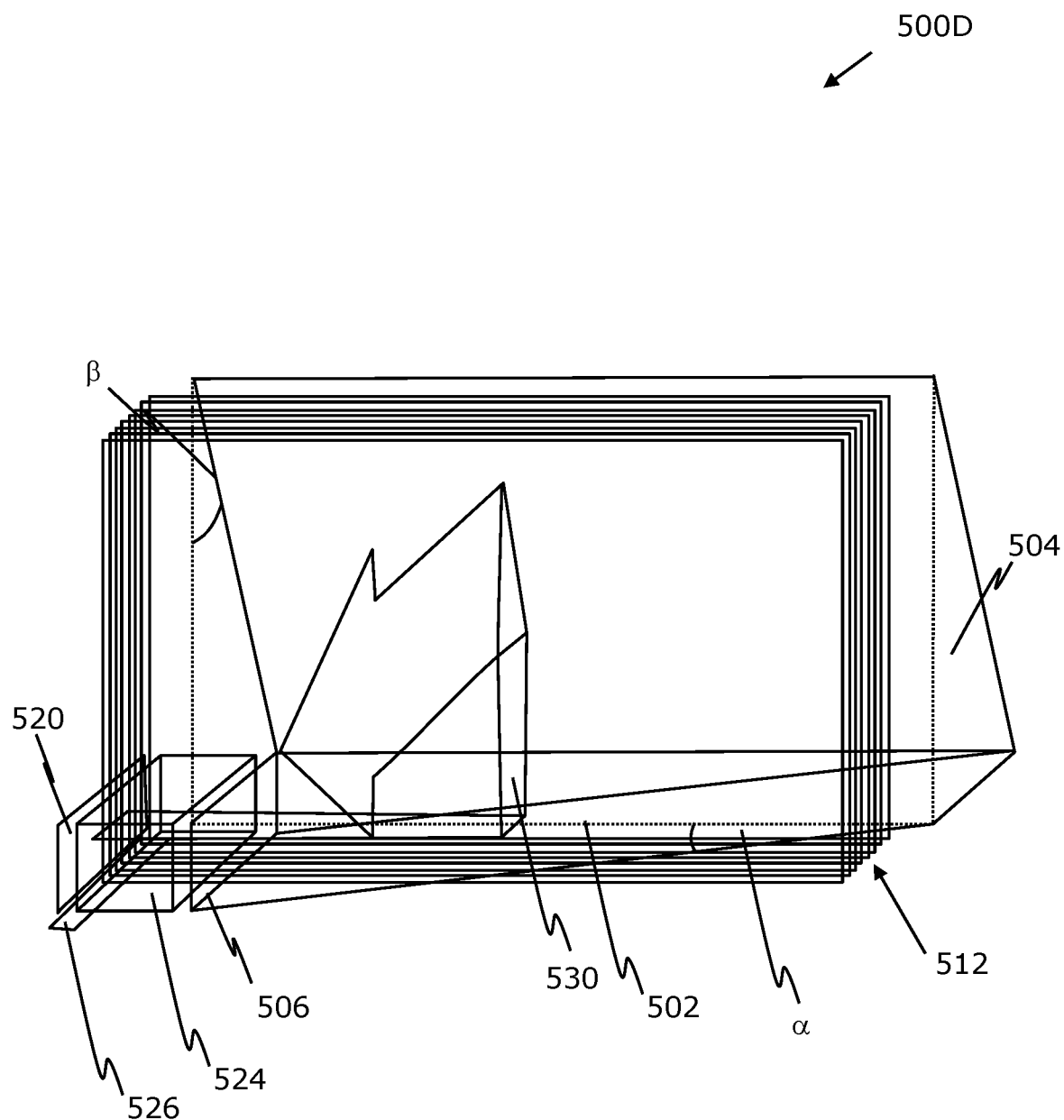
FIG. 5D is a diagrammatic illustration of a portion of a display system comprising the optical image expander arrangement with a projection volume, in accordance with another embodiment of the present disclosure.

Referring to FIG. 5D, illustrated is a diagrammatic illustration of a portion of a display system 500D comprising the optical image expander arrangement (such as, the optical image expander arrangement 500A of FIG. 5A) along with the projection volume 512, in accordance with another embodiment of the present disclosure. The display system 500D further comprises a spatial light modulator 520 and a prism assembly 524. Herein, a collimated light beam 526 directed towards the active region of the spatial light modulator 520 is modulated through the prism assembly 524. The modulated light beam passing through the prism assembly 524 and the aperture 506 is directed towards the first optical image expander 502 which typically is a thin strip of Fresnel-type mirror array whose smallest dimensions substantially corresponds to the respective dimension of the spatial light modulator 520. As the modulated light beam is expanded in one of the directions and reflected, it hits the second optical image expander 504 whose size is comparable to the size of the cross-section of the projection volume 512. A resulting expanded light beam 530 is then reflected from the second optical image expander 504 and directed towards the projection volume 512, where due to light scattering it is visualized at a certain physical depth. As the first optical image expander 502 and the second optical image expander 504 are positioned at low or very low angles in respect to the incident light rays, the overall footprint of the display system 500D becomes compact.

Referring to FIG. 6A, illustrated is a schematic illustration of a first optical image expander 600A for reflecting the modulated light beam to the second direction, in accordance with an embodiment of the present disclosure. The first optical image expander 600A has the first micropatterned surface 602 and is at the first angle α with the modulated light beam travelling in the first direction D1. The first micropatterned surface 602 has the first pitch $P_1$, which when reflecting the modulated light beam reflects only a small portion of it resulting in a segment 612 of "useful" information within the magnified image, while the segment 610 of the magnified image corresponds to a shadow region and doesn't carry image information.

Referring to FIG. 6B, illustrated is a schematic illustration of the first optical image expander 600B for reflecting the modulated light beam to the second direction, in accordance with an embodiment of the present disclosure. The first optical image expander 600B herein has the first pitch $P_2$ which is smaller than the first pitch $P_1$ of the first optical image expander 600A of FIG. 6A.

Referring to FIG. 6C, illustrated is a schematic illustration of the first optical image expander 600C for reflecting the modulated light beam to the second direction, in accordance with an embodiment of the present disclosure. The first optical image expander 600C herein has the first pitch $P_3$ which is still smaller than the first pitch $P_1$ of the first optical image expander 600A of FIG. 6A and the first pitch $P_2$ of the first optical image expander 600B of FIG. 6B.

Figure 7A:
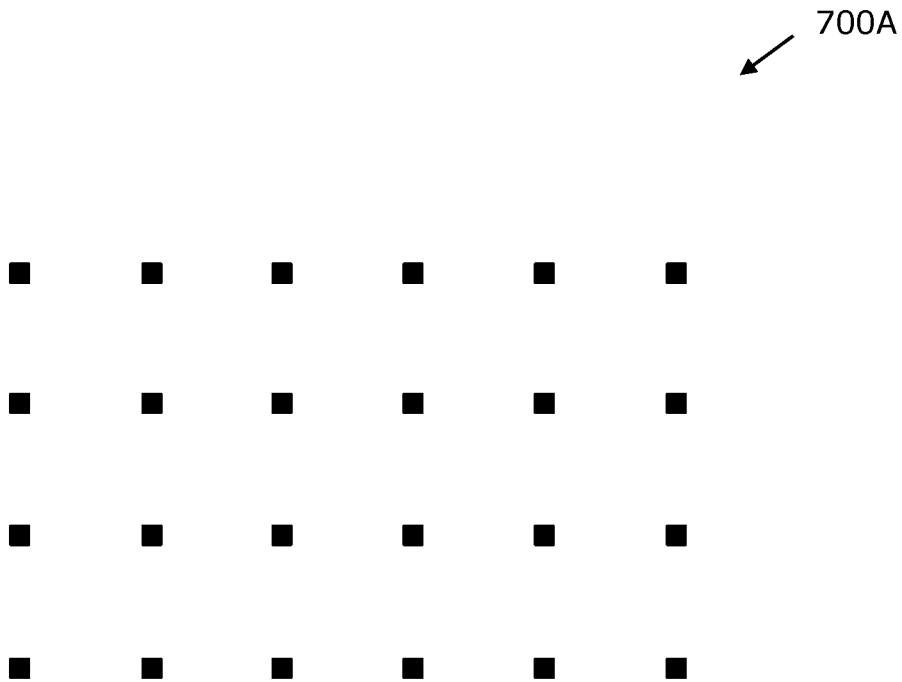
FIG. 7A is an illustration of image elements as obtained when the pitch of the first optical image expander and the second optical image expander is large, in accordance with an embodiment of the present disclosure.

Referring to FIG. 7A, illustrated is an illustration of image elements 700A, in accordance with an embodiment of the present disclosure. The image elements 700A is obtained when the pitch of the first optical image expander (such as, first optical image expander 600A of FIG. 6A) and the second optical image expander is courser or larger, like the first pitch $P_1$ as shown in FIG. 6A.

Figure 7B:
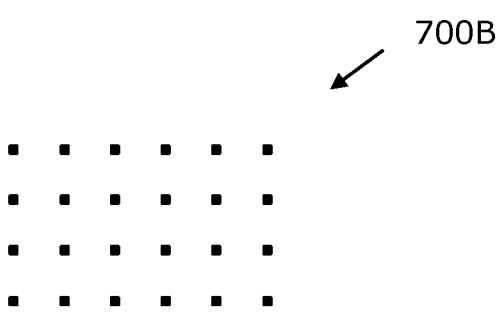
FIG. 7B is an illustration of image elements as obtained when the pitch of the first optical image expander and the second optical image expander is small, in accordance with another embodiment of the present disclosure.

Referring to FIG. 7B, illustrated is an illustration of image elements 700B, in accordance with another embodiment of the present disclosure. The image element 700B is obtained when the pitch of the first optical image expander (such as, first optical image expander 600C of FIG. 6C) and the second optical image expander is finer or smaller as 616, like the first pitch $P_3$ as shown in FIG. 6C.

Figure 7C:
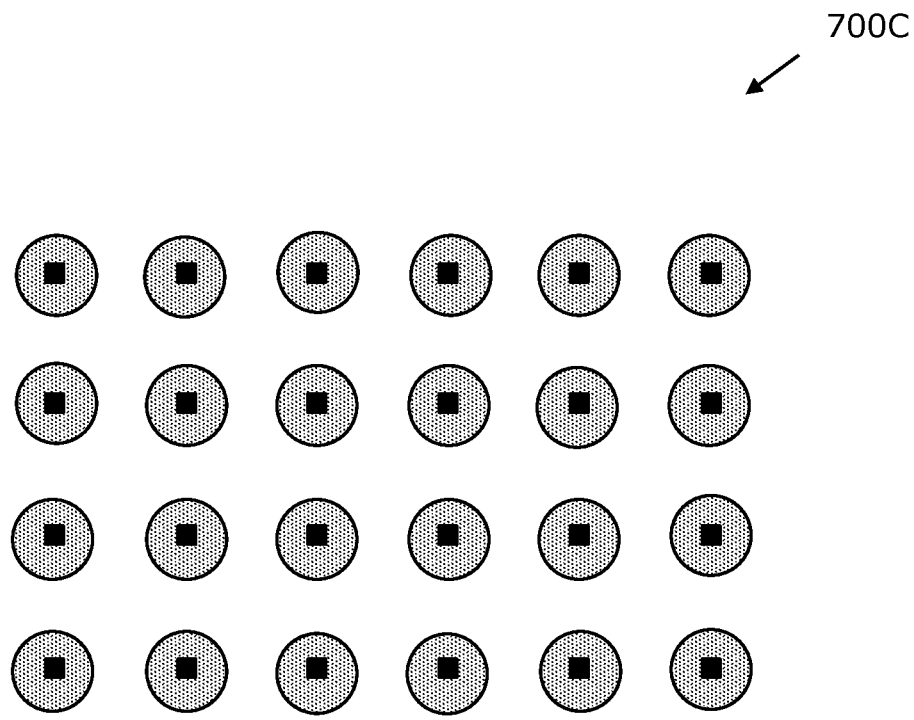
FIG. 7C is an illustration of image elements formed on a screen element, in accordance with an embodiment of the present disclosure.

Referring to FIG. 7C, illustrated is an illustration of image elements 700C formed on the screen element, in accordance with an embodiment of the present disclosure. The image elements 700C is formed when the pitch of the first optical image expander (such as, first optical image expander 600A of FIG. 6A) and the second optical image expander is courser or larger, like the first pitch $P_1$ as shown in FIG. 6A. It may be appreciated that no matter what be the pitch, the image information may not be lost. However, even if no image information is lost, if the spacing between adjacent image elements, that may be referred as image feature points, is large and the scattering power of the screen element is low, resultant image may have perceivable artifacts associated to blank spaces as shown in FIG. 7C.

Figure 7D:
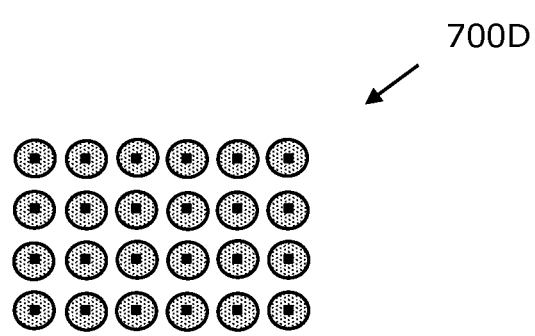
FIG. 7D is an illustration of image elements formed on a screen element, in accordance with another embodiment of the present disclosure.

Referring to FIG. 7D, illustrated is an illustration of image elements 700D formed on the screen element, in accordance with another embodiment of the present disclosure. The image elements 700D is formed when the pitch of the first optical image expander (such as, first optical image expander 600C of FIG. 6C) and the second optical image expander is finer or smaller, like the first pitch $P_3$ as shown in FIG. 6C. Herein, the pitch of the first optical image expander and the second optical image expander is courser or larger and hence, the gaps between adjacent image elements are reduced. The light scattering within the diffuser elements of the projection volume facilitate merging of the image elements into the smoothed image which will have more pleasing perceived image quality.

Figure 8:
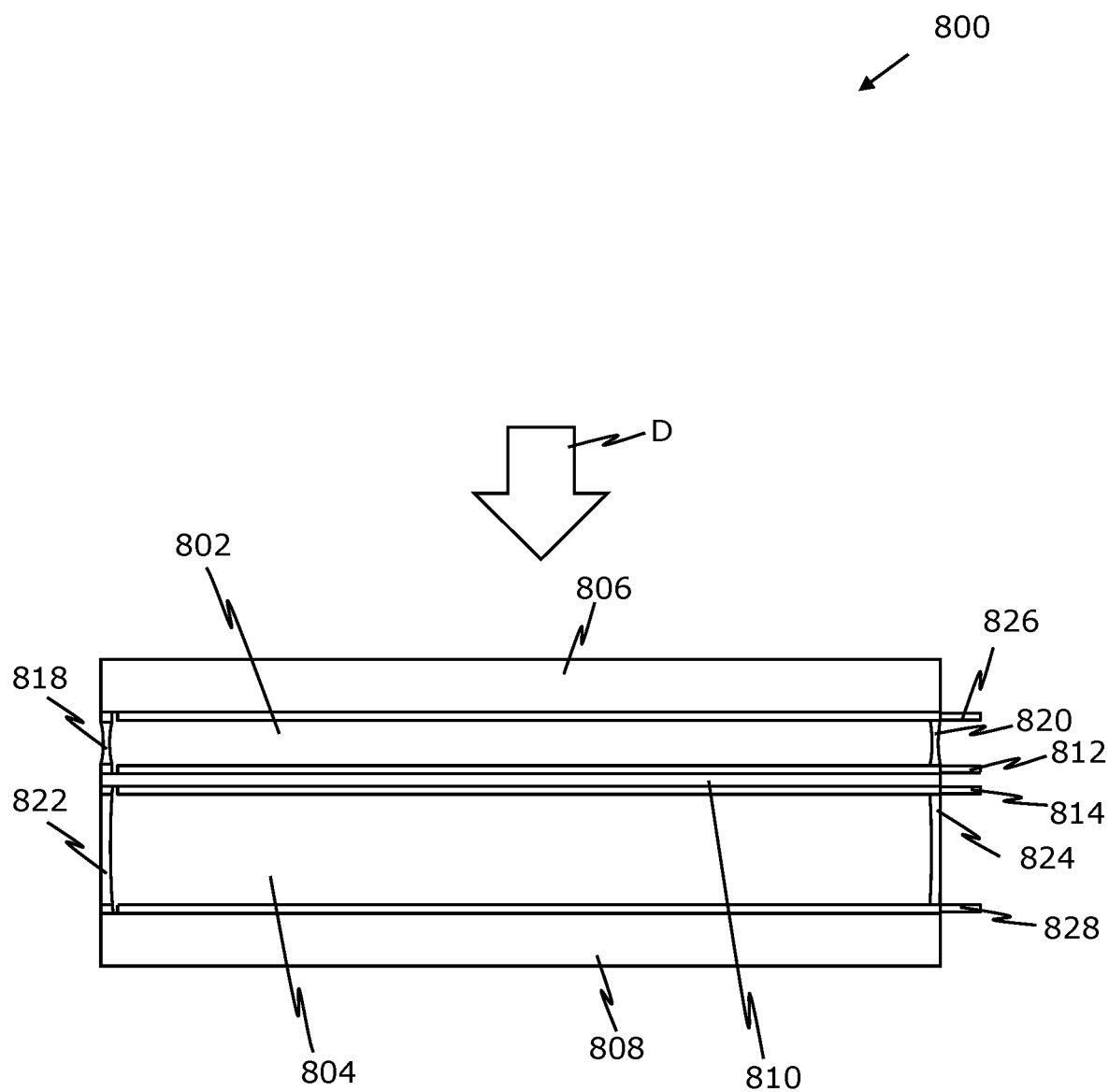
FIG. 8 is an illustration of a composite optical diffuser element, in accordance with an embodiment of the present disclosure.

Referring to FIG. 8, illustrated is an illustration of a composite optical diffuser element 800, in accordance with an embodiment of the present disclosure. The composite optical diffuser element 800 comprises a first active diffuser layer 802, a second active diffuser layer 804, a first outermost substrate 806, a second outermost substrate 808 and an internal substrate 810. The first outermost substrate 806 and the second outermost substrate 808 may be made of thicker material to provide rigidity to the overall structure. Typically, the internal substrate 810 is chosen to be as thin as possible. The internal substrate is coated on a first side 812 and a second side 814 with the transparent conductor. The sides of the first outermost substrate 806 and the second outermost substrate 808 facing the first active diffuser layer 802 and the second active diffuser layer 804 are also coated with transparent electrode. The first outermost substrate 806 and the second outermost substrate 808, facing the first active diffuser layer 802 and the second active diffuser layer 804 respectively, are also coated with transparent electrode 826 and 828. Furthermore, the first active diffuser layer 802 is positioned in the direction D of the incident light beam and is configured to be a pre-scattering layer. The first active diffuser layer 802 is considerably thinner than the second active diffuser layer 804. The first active diffuser layer 802 is contained within liquid crystal cells by applying a polymer gasket along sides 818, 820. The second active diffuser layer 804 is contained within liquid crystal cells by applying the polymer gasket along sides 822, 824.

Figure 9:
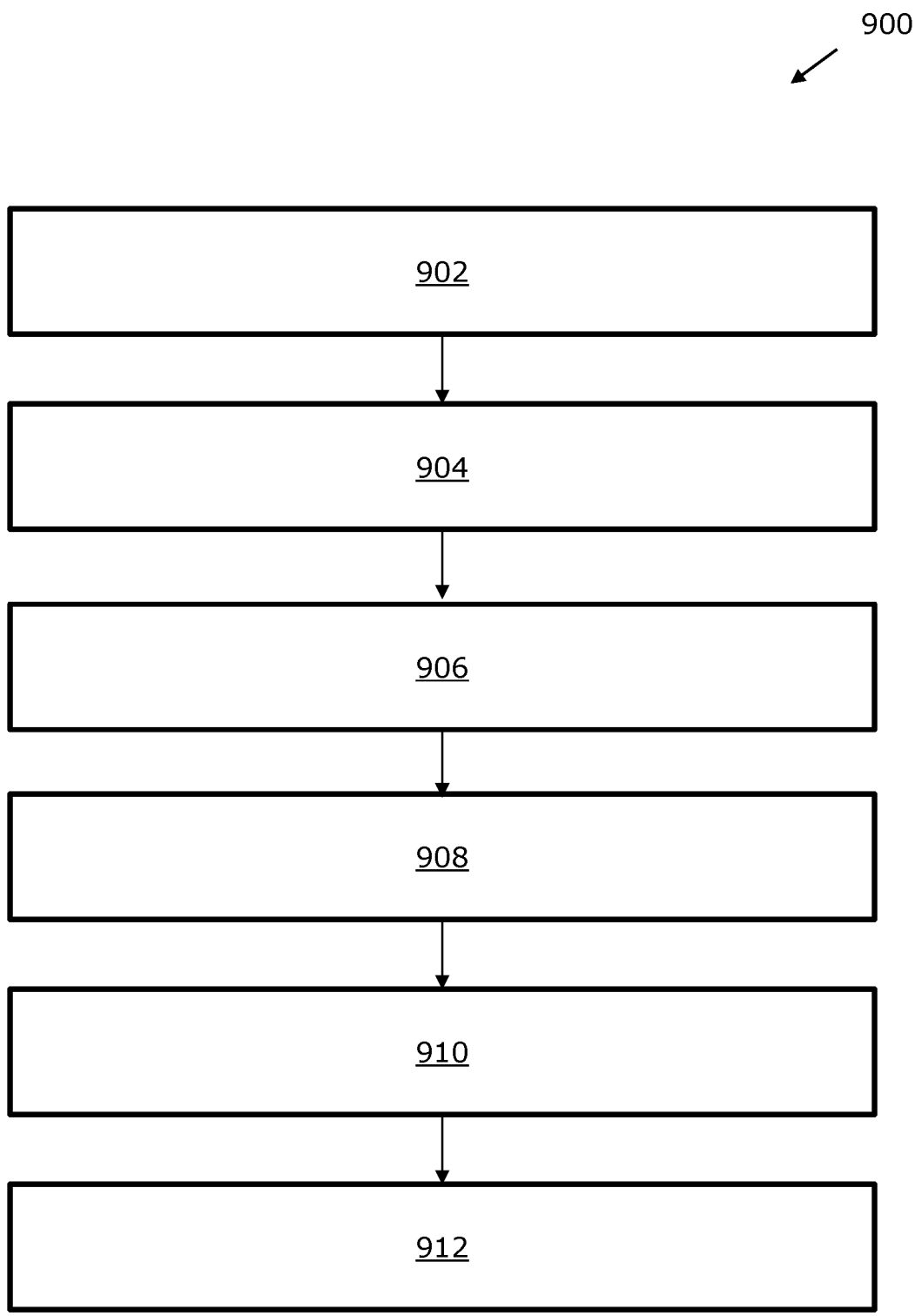
FIG. 9 is a flowchart listing steps of a method for displaying the three-dimensional image, in accordance with an embodiment of the present disclosure.

FIG. 9 is a flowchart 900 listing steps of a method for displaying the 3D image, in accordance with another embodiment of the present disclosure. The method includes, at a step 902, emitting the light beam. Herein the light beam may be emitted from the light source towards the first optics. The method includes, at a step 904, collimating and forming (expanding and shaping) the light beam. Herein, the light beam is received in the first optics and the light beam is collimated towards the spatial light modulator. The method includes, at a step 906, modulating the collimated light beam. Herein, the collimated light beam is modulated on the spatial light modulator and provided in the first direction. The method includes, at a step 908, reflecting the modulated light beam to the second direction. Herein, the modulated light beam is received on the first optical image expander at the first angle 'α' in respect to the first direction, expanded and reflected to the second direction. The first optical image expander comprises the first micropatterned surface comprising at least a first facet and at least a second facet inclined in respect to the at least first reflective facet, at least the first pitch comprising the at least first facet and the at least second reflective facet. Herein, the at least first reflective facet is inclined at the third angle 'γ' in respect to the first direction and at least part of the at least first facet is reflective. The method includes, at a step 910, reflecting the optical light beam in the third direction. Herein, the reflected light beam is received on the second optical image expander at the second angle 'β' in respect to the second direction, expanded and reflected to the third direction. The second optical image expander comprises the second micropatterned surface comprising at least a third facet and at least a fourth facet inclined in respect to the at least third facet and at least second pitch comprising the at least third facet and the at least fourth reflective facet. Herein, the at least third facet is inclined at the fourth angle 'δ' in respect to the second direction and at least part of the at least third facet is reflective. The method includes, at a step 912, receiving the reflected light beam on the screen element. The screen element herein, is arranged on the optical path after the second optical expander.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A display system for displaying a three-dimensional image, the display system comprising
    a light source employed to emit a light beam towards a first optics,
    the first optics employed to collimate the light beam and provide the collimated light beam towards a spatial light modulator;
    the spatial light modulator employed to modulate the collimated light beam, the modulated light beam is provided to a first direction (D1);
    a first optical image expander inclined at a first angle α in respect to the first direction, the first optical image expander is employed to reflect the modulated light beam to a second direction (D2);
    a second optical image expander inclined at a second angle (β) in respect to the second direction, the second optical image expander is on an optical path after the first optical image expander and employed to reflect the reflected light beam to a third direction;
    a screen element arranged on the optical path after the second optical expander;
wherein the first optical image expander comprises a first micropatterned surface comprising:
    at least a first facet and at least a second facet inclined in respect to the at least first facet;
    at least a first pitch (P) comprising the at least first facet and the at least second facet;
wherein the at least first facet is inclined at a third angle (γ) in respect to the first direction and at least part of the at least first facet is reflective;
and the second optical image expander comprises a second micropatterned surface comprising:
    at least a third facet and at least a fourth facet inclined in respect to the at least third facet,
    at least a second pitch comprising the at least third facet and the at least fourth facet;
wherein the at least third facet is inclined at a fourth angle (δ) in respect to the second direction and at least part of the at least third facet is reflective.

2. The display system according to claim 1, wherein the first optics is selected as an arrangement of at least one optical component of a lens, a prism, a metasurface, a holographic optical element, a diffractive optical element, a reflective optical element.

3. The display system according to claim 1, wherein the light beam has a divergence angle less than 1.5 degrees after collimating the light beam in the first optics.

4. The display system according to claim 1, wherein each of the first angle (α) and the second angle (β) is from 1 up to 10 degrees.

5. The display system according to claim 1, wherein each of the third angle (γ) and the fourth angle (δ) is 45 degrees.

6. The display system according to claim 1, wherein at least one of the first facet, the second facet, the third facet and the fourth facet is selected from at least one of a flat facet, a curved facet.

7. The display system according to claim 1, wherein the light source is selected to be at least one of a laser emitting a visible light spectrum, a light emitting diode (LED), a super luminescent light emitting diode (SLED).

8. The display system according to claim 1, wherein the spatial light modulator is selected to be at least one of a reflective spatial light modulator, a transmissive light modulator.

9. The display system according to claim 1, wherein the spatial light modulator is selected to be at least one of a digital micromirror device, a liquid crystal on silicon (LCoS), a ferroelectric liquid crystal on silicon (FLCoS) modulator, a liquid crystal display micro-panel.

10. The display system according to claim 1, wherein the screen element is a multi-plane volumetric display comprising a plurality of display elements.

11. The display system according to claim 10, wherein the plurality of display elements comprise at least one liquid-crystal based optical diffuser element configured to have two optical states:
the first optical state comprising high light transmission,
the second optical state comprising high haze values.

12. The display system according to claim 11, wherein the liquid-crystals of the at least one liquid-crystal based optical diffuser element are polymer free cholesteric liquid crystals.

13. The display element according to claim 10, wherein the at least one liquid-crystal based optical diffuser element comprises at least two active diffuser layers.

14. The display system according to claim 1, wherein the screen element comprises two or more image projection planes and the display system comprises a controller configured to synchronize operation of the light source, the spatial light modulator and the screen element to provide respective image plane information to the two or more respective image planes of the screen element.

15. A head mounted display system comprising the display system according to claim 1.

16. A head up display system comprising the display system according to claim 1.

17. A method for displaying a three-dimensional image comprising:
emitting a light beam from a light source towards a first optics;
receiving the light beam in the first optics and collimating the light beam towards a spatial light modulator;
modulating the collimated light beam on the spatial light modulator and providing the light beam in a first direction (D1);
receiving the modulated light beam on a first optical image expander at a first angle (α) in respect to the first direction and reflecting the modulated light beam to a second direction (D2);
receiving the reflected light beam on a second optical image expander at a second angle (β) in respect to the second direction and reflecting the optical light beam in a third direction (D3);
receiving the reflected light beam on a screen element arranged on an optical path after the second optical expander;
wherein the first optical image expander comprises a first micropatterned surface comprising:
at least a first facet and at least a second facet inclined in respect to the at least first facet;
at least a first pitch (P) comprising the at least first facet and the at least second facet;
wherein the at least first facet is inclined at a third angle (γ) in respect to the first direction and at least part of the at least first facet is reflective;
and the second optical image expander comprises a second micropatterned surface comprising:
at least a third facet and at least a fourth facet inclined in respect to the at least third facet,
at least a second pitch comprising the at least third facet and the at least fourth facet;
wherein the at least third facet is inclined at a fourth angle δ in respect to the second direction and at least part of the at least third facet is reflective.

18. The method according to claim 17, wherein each of the first angle (α) and the second angle (β) is from 1 up to 10 degrees.

19. The method according to claim 17, wherein each of the third angle (γ) and the fourth angle (δ) is 45 degrees.

20. The method according to claim 17, wherein the light beam has a divergence angle less than 1.5 degrees after collimating the light beam in the first optics.

* * * * *